(12) United States Patent
Mika et al.

(10) Patent No.: US 11,931,804 B2
(45) Date of Patent: Mar. 19, 2024

(54) EJECTOR FOR METAL JETTING BULK METALLIC GLASS COMPOSITIONS AND METHODS THEREOF

(71) Applicant: Additive Technologies, LLC, Palm City, FL (US)

(72) Inventors: Mariusz Tadeusz Mika, Raleigh, NC (US); Paul J. McConville, Webster, NY (US); Peter M. Gulvin, Webster, NY (US); Colin G. Fletcher, Cary, NC (US); Daimon Heller, Garner, NC (US); Miranda Moschel, Cary, NC (US)

(73) Assignee: ADDITIVE TECHNOLOGIES, LLC, Palm City, FL (US)

( * ) Notice: Subject to any disclaimer, the term of this patent is extended or adjusted under 35 U.S.C. 154(b) by 0 days.

(21) Appl. No.: 17/554,089

(22) Filed: Dec. 17, 2021

(65) Prior Publication Data

US 2023/0191487 A1 Jun. 22, 2023

(51) Int. Cl.
*B22F 10/22* (2021.01)
*B33Y 10/00* (2015.01)
*B33Y 30/00* (2015.01)
*B33Y 70/00* (2020.01)
*C22C 16/00* (2006.01)
*C22C 21/00* (2006.01)
*C22C 23/04* (2006.01)

(52) U.S. Cl.
CPC .............. *B22F 10/22* (2021.01); *B33Y 10/00* (2014.12); *B33Y 30/00* (2014.12); *B22F 2301/052* (2013.01); *B22F 2301/058* (2013.01); *B22F 2301/205* (2013.01); *B33Y 70/00* (2014.12); *C22C 16/00* (2013.01); *C22C 21/00* (2013.01); *C22C 23/04* (2013.01); *C22C 2200/02* (2013.01)

(58) Field of Classification Search
CPC ............... B22F 10/22; B22F 2301/052; B22F 2301/205; B22F 2301/058; B22F 7/06; B22F 12/20; B22F 2999/00; B22F 12/53; B33Y 10/00; B33Y 70/00; B33Y 30/00; B33Y 50/02; B33Y 80/00; C22C 16/00; C22C 21/00; C22C 2200/02; C22C 23/04; C22C 1/11; C22C 45/005; C22C 45/08; C22C 45/10; C22C 45/00; Y02P 10/25
USPC ......................................................... 148/538
See application file for complete search history.

(56) References Cited

U.S. PATENT DOCUMENTS 9,643,244 B2 * 5/2017 Prest ....................... B22D 27/15
2015/0044084 A1 * 2/2015 Hofmann .................. B05D 1/18
264/642
2017/0173694 A1 6/2017 Myerberg et al.

OTHER PUBLICATIONS

A. Peker and W.L. Johnson, "A highly processable metallic glass: Zr41.2-Ti13.8-Cu12.5-Ni10.0-Be22.5", Applied Physics Letters 63, 2343 (1993) (Year: 1993).*

* cited by examiner

*Primary Examiner* — Brian D Walck
*Assistant Examiner* — Danielle Carda
(74) *Attorney, Agent, or Firm* — MH2 TECHNOLOGY LAW GROUP LLP

(57) ABSTRACT

A metal component is disclosed. The metal component has a first dimension greater than 5 mm, and a second dimension greater than 5 mm. The metal component may include where the alloy includes titanium, aluminum, vanadium, carbon, nitrogen, and oxygen. The alloy may include zirconium, titanium, copper, nickel, and beryllium. The metal component is not die-cast, melt-spun, or forged. An ejector and a method for jetting the metal component is also disclosed.

12 Claims, 2 Drawing Sheets

EJECTOR FOR METAL JETTING BULK METALLIC GLASS COMPOSITIONS AND METHODS THEREOF

TECHNICAL FIELD

The present teachings relate generally to ejectors for metal jetting and, more particularly, to apparatus and methods for jetting bulk metallic glass compositions.

BACKGROUND

Bulk metallic glasses (BMG) are fabricated using high cooling rates to confine metallic elements in an amorphous solution. Bulk metallic glass alloys possess high elastic limits, high elastic deformation, high yield strength, and biocompatibility, as compared to alloys of similar composition. Bulk metallic glasses are materials of interest for potential substitution of common alloys used in critical applications, such as Ti-64 and the like. An exemplary BMG is known as Vitreloy 106a, which is a type of BMG commercialized and produced by Liquidmetal™. While Vitreloy exhibits exceptional properties, practical fabrication and/or manufacturing processes limit production to section thicknesses of 0.6 mm to 4.0 mm, with optimal as-molded properties for section thicknesses of 1.0 mm to 1.5 mm. Thicker sections may be possible, while having deteriorated properties. As an example, Vitreloy 106a has an elastic limit of 261 ksi and an elastic deformation of 2%, several times higher than any other commercially available comparable alloy.

Fabrication methods such as die casting have been utilized to manufacture using the high cooling rates required to produce BMGs but are limited in the size of parts that can be manufactured due to limitations on how quickly heat can be extracted from large parts or parts with thick cross-sections. Alternate additive manufacturing (AM) methods of depositing metal alloys using a shearing engine or gravity fed or mechanically fed liquid metals. The shearing engine production method may not produce as strong a bond between layers in the vertical direction due to limitations in temperature range capabilities. The mechanically or gravity fed or similar processes may be limited in terms of cooling rate control.

Therefore, it is desirable to fabricate larger or thicker components from bulk metallic glass alloys. Furthermore, a fabrication method of bulk metallic glass alloy having improved cooling rates, better control of surface finish, better control of mechanical properties, improved aesthetics, and better overall part quality would be desirable for the production of materials having enhanced properties for use in electronics, medicine, aviation, defense, and consumer products.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A metal component is disclosed. The metal component has a first dimension greater than 5 mm, and a second dimension greater than 5 mm. The metal component may include where the alloy includes titanium, aluminum, vanadium, carbon, nitrogen, and oxygen. The alloy may include zirconium, titanium, copper, nickel, and beryllium. The metal component is not die-cast, melt-spun, or forged.

An ejector for jetting a metal component is also disclosed. The ejector for jetting a metal component includes a nozzle orifice in connection with the inner cavity and configured to eject one or more droplets of a liquid metal which may include the first metal. The ejector for jetting a metal component also includes where the first metal is allowed to cool at a cooling rate of at least 200,000 degrees Celsius per second to form an amorphous microstructure. The ejector for jetting a metal component also includes where a first dimension of a formed metal component has a first dimension greater than 1.5 mm and a second dimension greater than 1.5 mm.

Implementations of the ejector for jetting a metal component may include a heating element configured to heat the inner cavity of the ejector, thereby causing a solid first metal to change to a liquid within the ejector, a coil wrapped at least partially around the ejector, and a power source configured to supply one or more pulses of power to the coil, which cause the one or more droplets of the liquid metal to be jetted out of the nozzle orifice. The ejector for jetting a metal component may include a feed of a second printing material feed of a solid printing material, configured to introduce the second printing material into the inner cavity of the ejector. The one or more pulses supplied to the coil are provided at a first power amplitude for the first metal, and the one or more pulses supplied to the coil are provided at a second power amplitude for the second metal. The first metal may be an alloy. The alloy may include titanium, aluminum, vanadium, carbon, nitrogen, and oxygen. The ejector for jetting a metal component may include a substrate configured to support the one or more droplets of the liquid metal as the one or more droplets of liquid metal solidify to form a metal component may include of an amorphous microstructure. The ejector for jetting a metal component may include a feed of a solid alloy printing material, configured to introduce the solid alloy printing material into the inner cavity of the ejector. The feed may be a wire or a powder.

A method for jetting a metal is disclosed. The method for jetting a metal also includes introducing a first alloy into an ejector defining an inner cavity and an exit nozzle. The method for jetting a metal also includes heating the first alloy in the ejector to form a liquid. The method for jetting a metal also includes ejecting a liquid droplet of the first alloy from the exit nozzle. The method for jetting a metal also includes allowing the liquid droplet to cool at a rate of at least 200,000 degrees Celsius per second to form an amorphous microstructure, and ejecting liquid droplets in a plurality of layers until a metal component is formed, where the metal component has a first dimension greater than 1.5 mm, and the metal component has a second dimension greater than 1.5 mm.

Implementations of the method for jetting a metal may include introducing a second alloy or second metal into the ejector, and ejecting a liquid droplet of the second alloy or second metal from the exit nozzle onto one of the plurality of layers of the first alloy. The method for jetting a metal may include heating the inner cavity of the ejector, thereby causing a solid first metal to change to a liquid within the ejector, and supplying one or more pulses of power to a coil wrapped at least partially around the ejector. The method for jetting a metal may include varying a frequency or power of the one or more pulses of power when ejecting a liquid droplet of the second alloy or second metal from the exit nozzle. Ejecting liquid droplets in a plurality of layers may be done in an oxygen-free atmosphere. The first alloy may include titanium, aluminum, vanadium, carbon, nitrogen, and oxygen.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
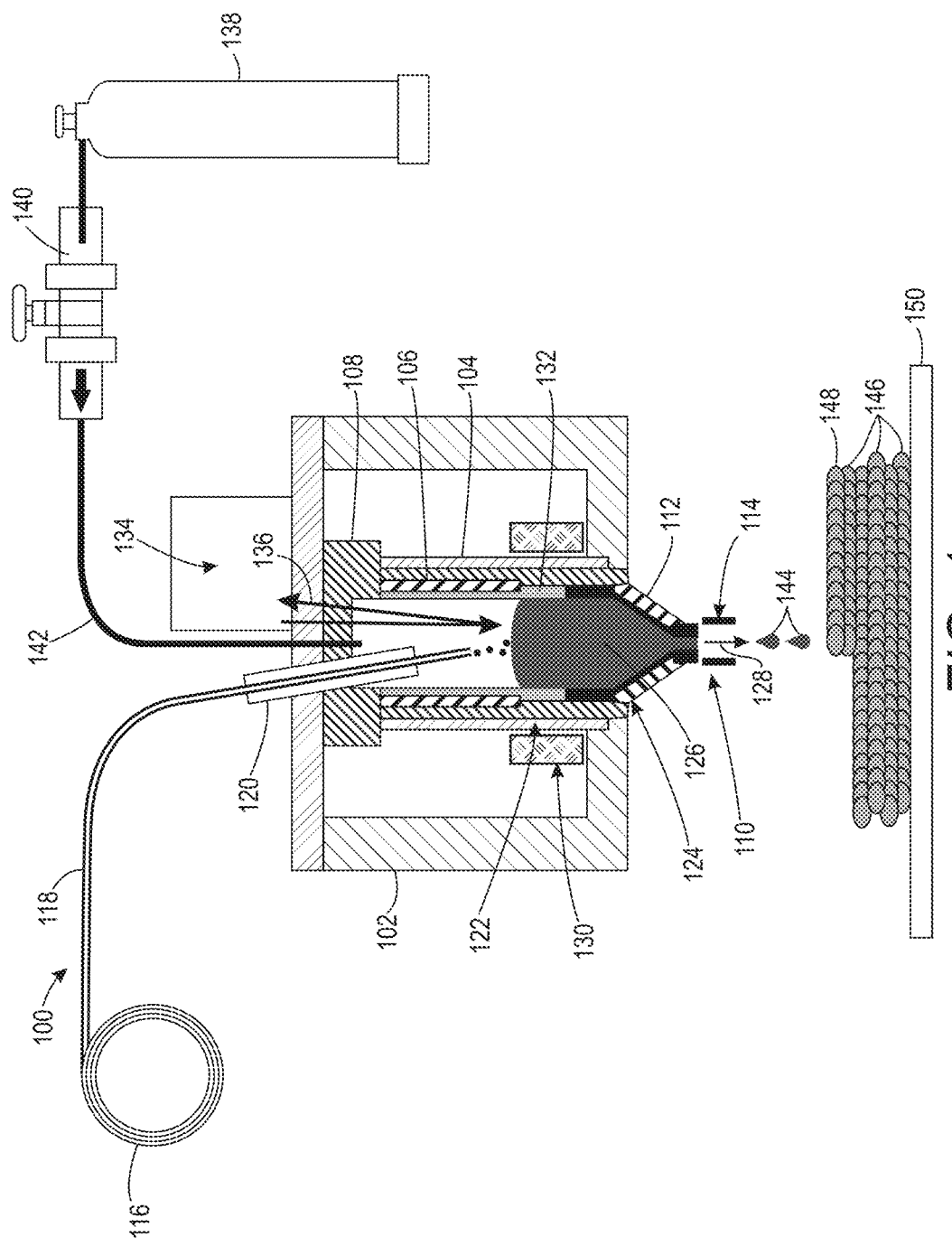
FIG. 1 depicts a schematic cross-sectional view of a single liquid ejector jet of a 3D printer configured for producing bulk metallic glasses, according to an embodiment.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

Current liquid metal jetting additive manufacturing processes use a metal wire or other printing material, sometimes a solid alloy printing material, retained as or heated to a liquid within a printing ejector to eject liquid drops which solidify to produce quality parts in a timely and cost-efficient manner. This particular method of manufacturing is well-suited for the fabrication of structures or compositions not easily fabricated by conventional methods known in metal working. For example, parts manufactured by traditional methods using known compositions of bulk metallic glass alloys are restricted in size, quality, productivity, and require excessive cost of tooling necessary to obtain the high cooling rates required to lock in or freeze the metal alloys used in bulk metallic glasses in an amorphous state upon cooling. Liquid metal jetting technology should eliminate such restrictions and is also capable of producing large parts limited in size only by the substrate or build area of the liquid metal jetting system, with greater than 99.5% density, and without incurring the high cost and long lead times associated with making dies for processes such as die casting.

An additive manufacturing method involving drop-on-demand (DOD) or three-dimensional (3D) printer system builds (e.g., prints) a 3D object from a computer-aided design (CAD) model, usually by successively depositing material layer upon layer. A drop drop-on-demand (DOD), particularly one that prints a metal or metal alloy, ejects a small drop of liquid aluminum alloy when a firing pulse is applied. Using this technology, a 3D part or other materials can be created from aluminum, another alloy, or material by ejecting a series of drops which bond together to form a continuous part. For example, a first layer may be deposited upon a substrate, which is configured to support deposited ink or printed 3D parts and then a second layer may be deposited upon the first layer. One particular type of 3D printer is a magnetohydrodynamic (MHD) printer, which is suitable for jetting liquid metal layer upon layer to form a 3D metallic object. Magnetohydrodynamic refers to the study of the magnetic properties and the behavior of electrically conducting fluids. In certain systems, alloys having differing electrical conductivities may require different or increased power supplied to the coils wrapped around a liquid metal ejector or may be required to pulse at varying frequencies for effective droplet ejection.

Liquid metal jetting technology further avoids limitations of traditional technologies and prior additive manufacturing technologies in the fabrication of bulk metallic glasses due to precision jetting of a controlled volume of metal, typically measured in nanoliters, weighing anywhere from 0.1 g to 5.0 g per 10,000 drops, with each drop being rapidly cooled to below the glass transition temperature (Tg) of the metal or metal alloy, while remaining independent of any requirements of rapidly cooling a bulk part all at once. Each liquid metal droplet metallurgically bonds with the layer underneath it as it cools. Moreover, liquid metal jetting operates at frequencies above 1 Hz, with 300 to 500 Hz being typical operative ranges, although much higher frequencies are possible if needed for a particular alloy. In an example of a bulk metallic glass such as Vitreloy 106a, a jetting operation would proceed at a temperature of 1050° C. and each droplet would be cooled to 300° C. during processing at a frequency of 300 Hz. This would result in a cooling rate of 225,000° C./s. This rate is well above a known 100° C./sec to 1000° C./sec needed to obtain optimal properties in bulk metallic glass fabrication. This example also demonstrates that bulk metallic glass alloys that cannot be made any other way due to their required critical cooling rate (CCR) being too high for traditional methods may be made using liquid metal jetting.

Thus, embodiments according to the present disclosure may utilize the atypically high cooling rates in liquid metal jetting (LMJ) to print bulk metallic glasses (BMG) in sizes that are not possible with more traditional methods such as die casting, or other additive manufacturing methods which require the use of a specialized equipment such as a shearing engine, and with better control inherent to the LMJ process over other additive manufacturing methods with regard to cooling rate, geometry, and deposition rate. The use of LMJ may further be used to develop new BMG materials that are not manufacturable by any other means. The size limitations and high cooling rates of LMJ enable fabrication of any sized part from BMG materials, beyond the dimensional limits of know fabrication methods. These materials are attractive because of their high yield strengths, interesting elastic properties, and uncharacteristic physical properties as compared to metals or metal alloys having crystalline grain boundaries or those which are made by conventional methods. Bulk metallic glasses (BMG) have remarkable mechanical properties such as a very high yield strengths and very high elastic limits and high elastic deformations but suffer from limitations on manufacturability. Bulk metallic glass is currently only manufacturable in section thickness of about 0.5 mm to 4.0 mm with optimal properties being achievable only within the 1.0-1.5 mm thickness range. Liquid metal jetting (LMJ) technology may eliminate this size limitation due to the capability of LMJ systems to surpass the required critical cooling rates (CCR) needed to obtain optimal properties of bulk metallic glasses for parts of any size. The capability of controlling drop size and deposition rate, and ability to accurately deposit drops over a large build area thereby eliminating the need to cool off the entire part all at once, as it is cooled off one small drop at a time makes LMJ a fabrication method of interest for bulk metallic glasses.

The term "bulk metallic glass" or "amorphous metal component," as used herein, may be used interchangeably with a metal having an "amorphous microstructure" and refers to molten or liquid printing materials as jetted by apparatus or systems described herein where the printing material that is ejected or jetted by the printing system, nozzle, or ejector is modified by exposure to a secondary additive, reactant, or other material. At the time of ejection, or nearly instantaneously thereafter, this exposure modifies the original liquid or molten printing material in a chemical, compositional, or physical manner, resulting in a modified printing material. The modification may take place immediately, or over time once a printing material is deposited on a substrate or other layer of previously deposited printing material, and the modified printing material is solidifying, drying or curing. This modification of the printing material may result in the creation of a composite, nanocomposite, alloy, mixture, or other modification known to one skilled in the art. When heated to their melting point, or above their respective glass transition temperature, metals and alloys lose their crystalline organizational structure and become fluid. As the metal cools, the crystal pattern reforms, usually at the initial areas of cooling. The crystals start to form simultaneously in various locations within a molten metal, not necessarily having the same orientation. This irregular formation of the metals crystalline structure upon cooling slowly can form irregular grain boundaries within the metal structure. When the cooling rate of the liquid metal is sufficiently high, or in other words occurs rapidly enough, the metal or alloy can retain its amorphous state even after solidification. Common engineering metal alloys such as 6061 aluminum, 4140 steel, Ti-6Al-4V, or similar allow deformation to occur when defects, otherwise known as dislocations, within their respective crystal structures are permitted to move along crystal directions within one or more crystallographic planes which together are known as slip systems. BMGs are devoid of a crystalline structure and therefore they are also devoid of slip systems that would allow dislocation movement over the scale present in crystalline metals. This unique behavior gives BMGs a higher elastic limit and a higher elastic deformation than would be possible with the aforementioned crystalline alloys. Another benefit of combining the LMJ process with BMGs is the acceleration of ongoing research into novel BMG-type materials such as $Al_{40}La_{35}Y_{10}Ni_{15}$, $Mg_{66}Zn_{29}Ca_5$, $Mg_{75}Ag_{9.6}Y_{7.7}Cu_{7.7}$, or any other novel BMG materials. This is attractive to Universities or research organizations because the LMJ process allows for direct printing of large specimens for tensile testing, corrosion testing, or any other study that requires larger samples than what is possible to currently make.

FIG. 1 depicts a schematic cross-sectional view of a single liquid ejector jet of a 3D printer configured for producing bulk metallic glasses, according to an embodiment. FIG. 1 shows a portion of a type of drop-on-demand (DOD) or three-dimensional (3D) printing system 100. The 3D printer or liquid ejector jet system 100 may include an ejector (also referred to as a body or pump chamber, or a "one-piece" pump) 104 within an outer ejector housing 102, also referred to as a lower block. The ejector 104 may define an inner volume 132 (also referred to as an internal cavity). A printing material 126 may be introduced into the inner volume 132 of the ejector 104. The printing material 126 may be or include a metal, an alloy, or the like. For example, the printing material 126 may be or include aluminum or aluminum alloys, introduced via a printing material supply 116 or spool of a printing material wire feed 118, in this case, a metal alloy wire. In alternate embodiments, the printing material feed may be in powder form. Certain embodiments may also include a second feed of a second printing material feed of a solid printing material, in order to introduce the second printing material into the inner volume 132 or cavity of the ejector 104.

In exemplary embodiments of the present disclosure, the printing material is a material that may form a bulk metallic glass upon rapid cooling, such as an alloy including titanium, aluminum, vanadium, carbon, nitrogen, and oxygen. Alternatively, the alloy may include zirconium-based alloys with and without beryllium such as Zr67Cu10.6Ni9.8Ti8.8Be3.8 or Zr70Cu13Ni9.9Al3.65Nb3.4 otherwise known by their commercial names as vit1b and vit106a, respectively; aluminum-based BMGs such as $Al_{40}La_{35}Y_{10}Ni_{15}$ or $Al_{85.5}Ni_{9.5}La_5$; or magnesium-based BMGs such as $Mg_{66}Zn_{29}Ca_5$. The liquid ejector jet system 100 further includes a first inlet 120 within a pump cap or top cover portion 108 of the ejector 104 whereby the printing material wire feed 118 is introduced into the inner volume 132 of the ejector 104. The second printing material feed may be introduced into the inner volume 132 of the ejector 104 via the first inlet 120, or alternatively through a separate introductory inlet in certain embodiments. The ejector 104 further defines a nozzle 110 also referred to as a nozzle orifice, an upper pump 122 area and a lower pump 124 area. One or more heating elements 112 are distributed around the pump chamber 104 to provide an elevated temperature source and maintain the printing material 126 in a molten state during printer operation. The nozzle orifice 110 is in connection with the inner cavity 132 of the ejector 104 and configured to eject one or more droplets of a liquid metal. The heating elements 112 are configured to heat or melt the printing material wire feed 118, thereby changing the printing material wire feed 118 from a solid state to a liquid state (e.g., printing material 126) within the inner volume 132 of the ejector 104. The three-dimensional 3D printing system 100 and ejector 104 may further include an air or argon shield 114 located near the nozzle 110, and a water coolant source 130 to further enable nozzle and/or ejector 104 temperature regulation. The liquid ejector jet system 100 further includes a level sensor 134 system which is configured to detect the level of molten printing material 126 inside the inner cavity 132 of the ejector 104 by directing a detector beam 136 towards a surface of the printing material 126 inside the ejector 104 and reading the reflected detector beam 136 inside the level sensor 134.

The 3D printing system 100 may also include a power source, not shown herein, and one or more metallic coils 106 wrapped at least partially around the ejector 104 and enclosed in a pump heater or heating elements 112 that are wrapped at least partially around the ejector 104. The heating elements 112 heat the inner cavity 132 of the ejector 104, thereby causing a solid metal to change to a liquid within the ejector 104. The power source may be coupled to the coils 106 and configured to provide an electrical current to the coils 106. An increasing magnetic field caused by the coils 106 may cause an electromotive force within the ejector 104, that in turn causes an induced electrical current in the printing material 126. Thus, the power source supplies one or more pulses of power to the coil 106, which cause the one or more droplets of the liquid metal to be jetted out of the nozzle orifice 110. The magnetic field and the induced electrical current in the printing material 126 may create a radially inward force on the printing material 126, known as a Lorenz force. The Lorenz force creates a pressure at an inlet of a nozzle 110 of the ejector 104. The pressure causes the printing material 126 to be jetted through the nozzle 110 in the form of one or more liquid drops 128. When certain printing materials are used in the 3D printing system 100, higher amounts of power or alternate pulse parameters or printing parameters may be required to eject printing material droplets, depending upon the electrical conductivity of the printing material used in the 3D printing system 100. For example, if the electrical conductivity of a particular alloy is lower than the electrical conductivity of a standard aluminum alloy, increased power to the coils might be necessary to maintain consistent jetting quality. While not necessary, the modified printing power or pulse parameters may enable printing at similar speeds or quality as a standard printing material used in such a system, such as an aluminum or aluminum-based alloy. In one example embodiment, there may be one or more pulses supplied to the coil 106, provided at a first power amplitude for the first metal, and one or more pulses supplied to the coil provided at a second power amplitude for the second metal. In another example embodiment, there may be one or more pulses supplied to the coil 106, provided at a first frequency for the first metal, and one or more pulses supplied to the coil provided at a second frequency for the second metal.

The 3D printing system 100 may also include a substrate 150, that is positioned proximate to (e.g., below) the nozzle 110. The ejected drops 144 may land on the substrate 150 and solidify to produce a 3D object. The substrate 150 supports the one or more ejected droplets of the liquid metal as the one or more droplets of liquid metal solidify to form a metal component consisting of an amorphous microstructure. The 3D printing system 100 may also include a substrate control motor, not shown herein, that is configured to move the substrate while the drops 128 are being jetted through the nozzle 110, or during pauses between when the drops 144 are being jetted through the nozzle 110, and in a direction 128 towards the substrate 150 to cause the 3D object to have the desired shape and size during creation of the formed metal component. The substrate control motor may be configured to move the substrate in one dimension (e.g., along an X axis), in two dimensions (e.g., along the X axis and a Y axis), or in three dimensions (e.g., along the X axis, the Y axis, and a Z axis). In another embodiment, the ejector 104 and/or the nozzle 110 may be also or instead be configured to move in one, two, or three dimensions. In other words, the substrate 150 may be moved under a stationary nozzle 110, or the nozzle 110 may be moved above a stationary substrate 150. In yet another embodiment, there may be relative rotation between the nozzle 110 and the substrate 150 around one or two additional axes, such that there is four or five axis position control. In certain embodiments, both the nozzle 110 and the substrate 150 may move. For example, the substrate may move in X and Y directions, while the nozzle 110 moves up and/or down in a Y direction. 9.

As shown in FIG. 1, the ejected droplets 144 exit the nozzle 110 and one or more layers of first alloy 146, which is a bulk metallic glass precursor alloy, is deposited onto the substrate 150. The bulk metallic glass precursor alloy has an amorphous microstructure when in a molten state. The rapid cooling rates associated with a droplet-by-droplet deposition of a liquid metal alloy precursor to a bulk metallic glass in the system 100 as described herein, locks in or freezes the amorphous microstructure of the alloy in place as each droplet cools. Upon landing on the substrate 150, the droplets of either a first metal alloy or a second metal alloy is allowed to cool at a cooling rate of about 200,000° C. per second under typical operating conditions or any other cooling rate above the critical cooling rate (CCR), which is sufficiently rapid to form an amorphous microstructure. It should be noted that in certain examples of the present disclosure, critical cooling rate of a metal or metal alloy to form an amorphous microstructure sufficient to form a bulk metallic glass may be dependent upon the composition of the metal or metal alloy and thus may be in a range of from about 100° C./sec to about 1000° C./sec, or from about 1000° C./sec to about 100,000° C./sec, or from about 100,000° C./sec to about 200,000° C./sec. The threshold level of amorphous microstructure may be 99% or greater within an alloy formed according to methods described herein.

Multiple layers are deposited until the resulting metal component has a first dimension greater than 1.5 mm and a second dimension greater than 1.5 mm. In certain embodiments multiple layers are deposited until the resulting metal component has a first dimension greater than 3.0 mm and a second dimension greater than 3.0 mm. In still other embodiments, multiple layers are deposited until the resulting metal component has a first dimension greater than 4.0 mm and a second dimension greater than 4.0 mm. It should be noted that either the first dimension or the second dimension as referenced herein refer to a thickness of the resulting metal component, or bulk metallic glass. While known methods for making bulk metallic glasses result in thin sheets or ribbon type structures, bulk metallic glasses having a third dimension greater than 1.5 mm are difficult to fabricate by such means, as they result in a sacrifice of physical properties, most likely due to impediments to the rapid cooling achievable with the liquid metal jetting systems described herein. Known amorphous metals are typically fabricated as melt spun ribbons, die cast, or molded and are limited in dimension by 1.5 mm upper boundary, based on a reduction in physical properties.

Exemplary alloys that may be fabricated into metal components having an amorphous microstructure such that they result in bulk metallic glasses upon cooling include alloys made from titanium, aluminum, vanadium, carbon, nitrogen, and oxygen. Alternate exemplary alloys that may be fabricated into metal components having an amorphous microstructure such that they result in bulk metallic glasses upon cooling include alloys made from zirconium, titanium, copper, nickel, and beryllium. In still other embodiments, one or more layers of a second alloy 148 which may be a precursor to a BMG or other alloy or metal may be deposited on an outer surface of a bulk metallic glass formed from the one or more layers of the first alloy 146. The one or more layers of a second alloy ay include any of the bulk metallic glasses as referenced herein, or alternatively, more conventional metals or alloys, examples which include but are not limited to copper, stainless steel, aluminum, alloys or combinations thereof. Such a construction, having more than one alloy may require a system flush in between fabrication or operative steps in fabricating the amorphous metal component. The amorphous metal components, or bulk metallic glasses are fabricated using the metal jetting ejector system 100 and therefore, the metal component is not die-cast, melt-spun, or forged, which could result in a similar reduction in the desirable properties associated with bulk metallic glasses. Metal components may have a discrete delineation between a first metal alloy and a second metal alloy, or may be interpenetrating in a stepped, patterned or gradient, possibly by having multiple ejectors within a printing system, each able to eject droplets of a different metal, in certain embodiments. The two metals or alloys would share a physical or mechanical bond. An example arrangement could be a component having an outer layer of copper, which is a good heat exchange material, over a stainless steel or aluminum bulk metallic glass-based component. In alternate embodiments, different portions of a metal component, such as flanges or mounting supports may be added to a main portion of a metal component using a process as described herein.

The 3D printing system 100 may also include one or more gas-controlling devices, which may be or include a gas source 138. The gas source 138 may be configured to introduce a gas. The gas may be or include an inert gas, such as helium, neon, argon, krypton, and/or xenon. In another embodiment, the gas may be or include nitrogen. The gas may include less than about 10% oxygen, less than about 5% oxygen, or less than about 1% oxygen. In at least one embodiment, the gas may be introduced via a gas line 142 which includes a gas regulator 140 configured to regulate the flow or flow rate of one or more gases introduced into the three-dimensional 3D printing system 100 from the gas source 138. For example, the gas may be introduced at a location that is above the nozzle 110 and/or the heating element 112. This may allow the gas (e.g., argon) to form a shroud/sheath around the nozzle 110, the drops 128, the 3D object, and/or the substrate to reduce/prevent the formation of oxide (e.g., aluminum oxide) in the form of an air shield 114. Controlling the temperature of the gas may also or instead help to control (e.g., minimize) the rate that the oxide formation occurs. In certain embodiments, an inert atmosphere, or one of a particular gas content, may be introduced to surround the 3D printing system 100 to control surface oxidation or other surface reactions with a particular metal composition jetted from the nozzle 110 of the 3D printing system 100.

The liquid ejector jet system 100 may also include an enclosure 102 that defines an inner volume (also referred to as an atmosphere). In one embodiment, the enclosure 102 may be hermetically sealed. In another embodiment, the enclosure 102 may not be hermetically sealed. In one embodiment, the ejector 104, the heating elements 112, the power source, the coils, the substrate, additional system elements, or a combination thereof may be positioned at least partially within the enclosure 102. In another embodiment, the ejector 104, the heating elements 112, the power source, the coils, the substrate, additional system elements, or a combination thereof may be positioned at least partially outside of the enclosure 102.

Applications for such bulk metallic glasses printed using a liquid metal jetting process as described herein may include research and development of new bulk metallic glass (BMG) alloys, metals or alloys that a useful in application areas such as biocompatibility, aerospace, defense, medicine, or consumer products such as consumer electronics having high yield strength and other desirable properties, as certain bulk metallic glass alloys cannot be made using existing methods. Liquid metal jetting as described herein may provide bulk metallic glasses at lower costs in limited or prototype or research run volumes. Additional example compositions or components may include zirconium-based BMGs such as $Zr_{67}Cu_{10.6}Ni_{9.8}Ti_{8.8}Be_{3.8}$ or $Zr_{70}Cu_{13}Ni_{9.9}Al_{3.65}Nb_{3.4}$ otherwise known by their commercial names as vit1b and vit106a, respectively; aluminum-based BMGs such as $Al_{40}La_{35}Y_{10}Ni_{15}$ or $Al_{85.5}Ni_{9.5}La_5$; or magnesium-based BMGs such as $Mg_{66}Zn_{29}Ca_5$. Embodiments as described in the foregoing examples may include the use or fabrication of particular alloys not manufacturable by typical methods or means. For example, alloys high strength in one area and better ductility in another as well as alloys having variable or tailorable thermal or electrical conductivity, strength, hardness, ductility, and local modification of properties within a part may also be possible. Materials having thermal mismatches may be constructed as well. Additional advantages of embodiments described herein include finer control of tailoring properties, reduced cost, improved productivity, the modification of localized areas within a part, or facile fabrication of gradient layer type alloys through a bulk material by gradually changing alloy composition or cooling rates during printing operations. In certain aspects, without wishing to be bound by any particular theory, cooling rates of bulk metallic glass alloys may be driven by liquid metal alloy drop size during a jetting process. By altering or tailoring drop size, the cooling rate of a particular metal may be influenced as well, and in particular, a temperature of a jetted metal drop and a temperature of a drop that a jetted metal drop may land upon. Manipulation of drop size, drop speed, drop timing, drop frequency, number of simultaneously jetted drops, and other parameters may be used to control cooling rates or provide a manageable melt pool, which can be cooled at a controllable and appropriate rate.

Figure 2:
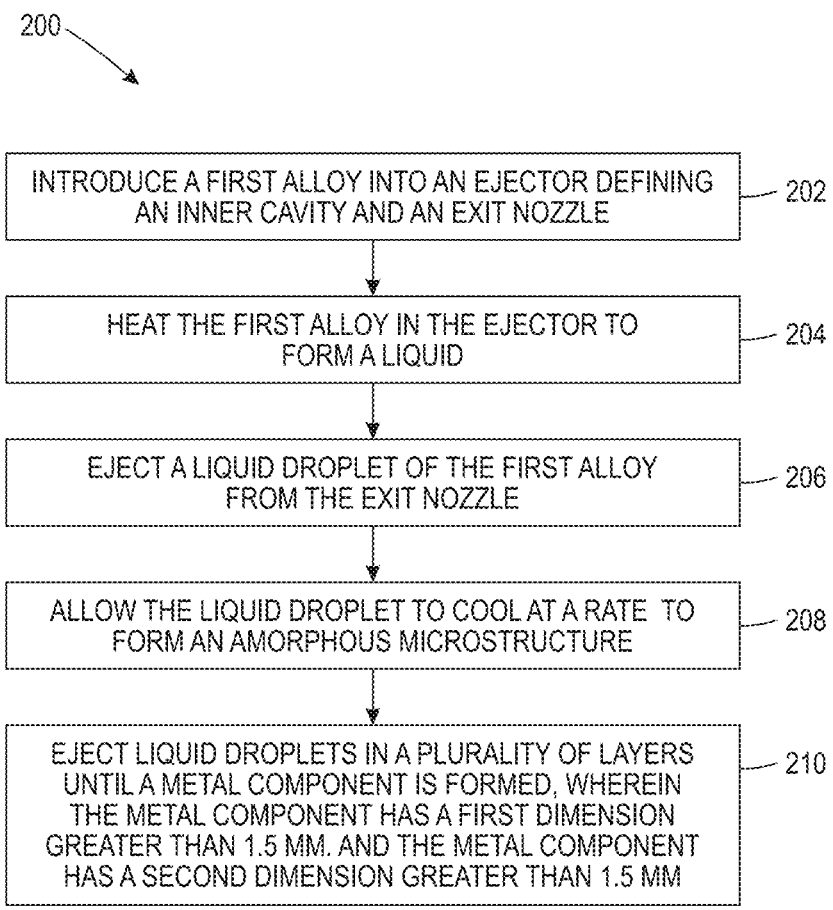
FIG. 2 is a flowchart illustrating a method of metal jetting, according to an embodiment.

FIG. 2 is a flowchart illustrating a method of metal jetting, according to an embodiment. The method for jetting a metal 200, includes a step to introduce a first alloy into an ejector defining an inner cavity and an exit nozzle 202. The next step is to heat the first alloy in the ejector to form a liquid 204, followed by a step to eject a liquid droplet of the first alloy from the exit nozzle 206. Finally, method for jetting a metal 200 includes the steps of allowing the liquid droplet to cool at a rate of about 200,000° C. per second under typical operating conditions or any other rate above the CCR in order to form an amorphous microstructure 208 and ejecting liquid droplets in a plurality of layers until a metal component is formed, wherein the metal component has a first dimension greater than 1.5 mm, and the metal component has a second dimension greater than 1.5 mm 210. In certain embodiments, the method for jetting a metal 200 may include introducing a second alloy or second metal into the ejector and ejecting a liquid droplet of the second alloy or second metal from the exit nozzle onto one of the plurality of layers of the first alloy. This method provides a metal component having a bulk metallic glass structure as described, with an external layer of a second metal or alloy on the first alloy of a bulk metallic glass. The first alloy or the second alloy may have a composition of other bulk metallic glass compositions as described herein, or alternatively, the second alloy may include copper, stainless steel, aluminum, or alloys or combinations thereof. Structures consisting of high strength BMG materials such as $Mg_{66}Zn_{29}Ca_5$ can be susceptible to corrosion on their own however additions of metals or alloys with better corrosion resistance such as magnesium, aluminum, or other metals or alloys can be applied by LMJ during the part building process to the surfaces where enhanced corrosion resistance is desired. Also combinations of crystalline alloys such as aluminum 6061 can be combined with BMGs in order to reduce cost, optimized desired stiffness, thermal properties, electrical properties, corrosion properties, manufacturability or any other desired characteristic resulting from the combination of two or more materials. Exemplary methods of the present disclosure further include where the method for jetting a metal 200 includes heating the inner cavity of the ejector, thereby causing a solid first metal to change to a liquid within the ejector and supplying one or more pulses of power to a coil wrapped at least partially around the ejector. The method for jetting a metal 200 may also include varying power, pulse frequency, pulse time, or temperature when ejecting a liquid droplet of the second alloy or second metal from the exit nozzle. As described previously, different alloy compositions may require or eject droplets more efficiently with the use of different power amounts, temperatures, pulse frequencies, or pulse times delivered to a coil wrapped around the ejector. In certain embodiments, the method for jetting a metal 200 may include ejecting liquid droplets in a plurality of layers is done in an oxygen-free atmosphere. Additionally, the method 200 may include jetting a first alloy including titanium, aluminum, magnesium, silicon, zinc, vanadium, carbon, nitrogen, and oxygen.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A metal component, comprising:
an alloy consisting essentially of an amorphous microstructure wherein the alloy has an elastic deformation of 0.2% or greater;
wherein:
the metal component has a first dimension greater than 1.5 mm; and
a second dimension greater than 1.5 mm; and
a composition of the alloy changes through a bulk of the metal component while maintaining an amorphous microstructure throughout and
wherein:
the amorphous microstructure comprises a microstructure dimension of from about 0.01 mm to about 0.75 mm; and
the metal component is formed by a plurality of droplets wherein each of the plurality of droplets has been cooled at a rate of from about 100,000° C./sec to about 200,000° C./sec.

2. The metal component of claim 1, wherein the amorphous microstructure is 99% amorphous or greater.

3. The metal component of claim 1, wherein the alloy comprises titanium, aluminum, vanadium, carbon, nitrogen, and oxygen.

4. The metal component of claim 1, wherein the alloy comprises zirconium, titanium, copper, nickel, and beryllium.

5. The metal component of claim 1, wherein the metal component is not die-cast, melt-spun, or forged.

6. The metal component of claim 1, further comprising a plurality of layers formed by the plurality of droplets and wherein the composition of the alloy changes at each layer, with each layer having a thickness from about 0.1 mm to about 0.75 mm.

7. A method for jetting a metal, comprising:
introducing a first alloy into an ejector defining an inner cavity and an exit nozzle;
heating the first alloy in the ejector to form a liquid;
ejecting a liquid droplet of the first alloy from the exit nozzle;
allowing the liquid droplet to cool at a rate of from about 100,000° C./sec to about 200,000° C./sec to form an amorphous microstructure comprising a microstructure dimension of from about 0.01 mm to about 0.75 mm; and
ejecting liquid droplets in a plurality of layers until a metal component is formed, wherein the metal component has a first dimension greater than 1.5 mm, and the metal component has a second dimension greater than 1.5 mm.

8. The method for jetting a metal of claim 7, further comprising:
introducing a second alloy or second metal into the ejector; and
ejecting a liquid droplet of the second alloy or second metal from the exit nozzle onto one of the plurality of layers of the first alloy.

9. The method for jetting a metal of claim 8, further comprising:
heating the inner cavity of the ejector, thereby causing a solid first metal to change to a liquid within the ejector; and
supplying one or more pulses of power to a coil wrapped at least partially around the ejector.

10. The method for jetting a metal of claim 9, further comprising varying a frequency or power of the one or more pulses of power when ejecting a liquid droplet of the second alloy or second metal from the exit nozzle.

11. The method for jetting a metal of claim 7, wherein ejecting liquid droplets in a plurality of layers is done in an oxygen-free atmosphere.

12. The method for jetting a metal of claim 7, wherein the first alloy comprises titanium, aluminum, vanadium, carbon, nitrogen, and oxygen.

\* \* \* \* \*